(12) United States Patent
Loubat et al.

(10) Patent No.: US 7,113,064 B2
(45) Date of Patent: Sep. 26, 2006

(54) ACTIVE DEVICE FOR DAMPING THE VIBRATIONS OF A VIBRATING ELEMENT

(75) Inventors: Patrice Loubat, La Ferte Villeneuil (FR); Jérôme Joly, Chateaudun (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/946,931

(22) Filed: Sep. 22, 2004

(65) Prior Publication Data
US 2005/0073381 A1    Apr. 7, 2005

(30) Foreign Application Priority Data
Oct. 1, 2003  (FR) ................... 03 11495

(51) Int. Cl.
*H01F 7/08*    (2006.01)
(52) U.S. Cl. ..................... 335/220
(58) Field of Classification Search ........ 335/220–236, 335/256, 261–262, 281–282; 336/83, 210; 267/140.14, 140.15
See application file for complete search history.

(56) References Cited

U.S. PATENT DOCUMENTS

| | | | |
|---|---|---|---|
| 4,278,959 A * | 7/1981 | Nishimiya et al. ........... 335/262 |
| 4,724,923 A * | 2/1988 | Waterman ................... 181/208 |
| 5,231,336 A | 7/1993 | Van Namen ................. 318/128 |
| 5,236,186 A * | 8/1993 | Weltin et al. ........... 267/140.15 |
| 5,427,362 A | 6/1995 | Schilling et al. ....... 267/140.14 |
| 5,592,138 A * | 1/1997 | Tobben ....................... 336/210 |
| 5,718,418 A | 2/1998 | Gugsch ................. 267/140.14 |
| 5,947,457 A * | 9/1999 | Swanson et al. ....... 267/140.14 |
| 6,847,284 B1 * | 1/2005 | Gamou et al. .............. 336/223 |
| 6,907,969 B1 * | 6/2005 | Ichikawa et al. ........... 188/379 |
| 2002/0060620 A1 * | 5/2002 | Bircann et al. ............. 335/256 |

FOREIGN PATENT DOCUMENTS

WO    WO 93/13586    7/1993

OTHER PUBLICATIONS

Preliminary Search Report, dated Jun. 18, 2004, Appl. No. FR 0311495.

* cited by examiner

*Primary Examiner*—Elvin Enad
*Assistant Examiner*—Bernard Rojas
(74) *Attorney, Agent, or Firm*—McCracken & Frank LLP

(57) ABSTRACT

An active device for damping vibration comprises an actuator comprising a magnetically permeable armature and a coil associated with a magnetically permeable yoke sliding along a displacement axis under the effect of a magnetic field generated by a current conveyed by the coil. Displacement of the coil relative to the armature is generated by forces corresponding to magnetic field lines generated by the coil, concentrated in the armature and the yoke, and directed essentially through an airgap situated between the armature and the yoke.

17 Claims, 4 Drawing Sheets

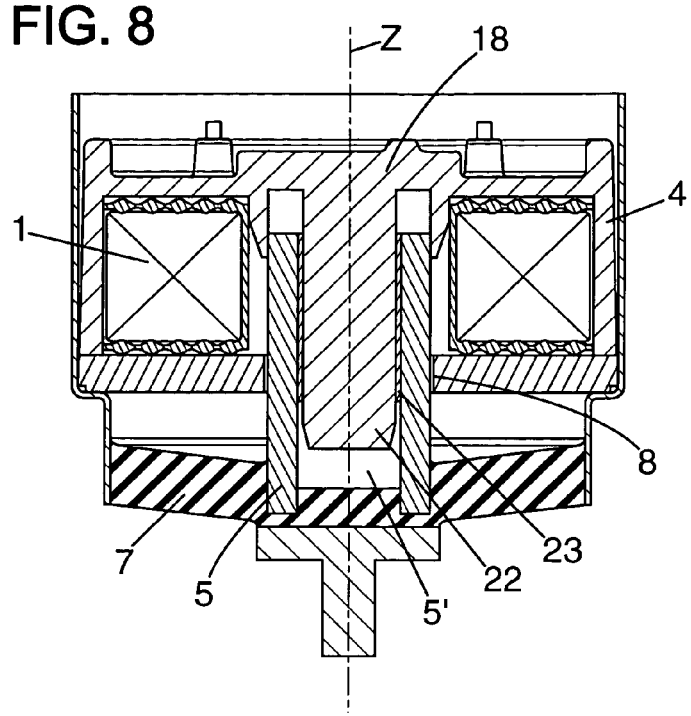
FIG. 8
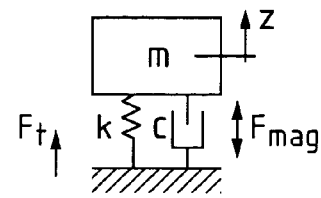
FIG. 9
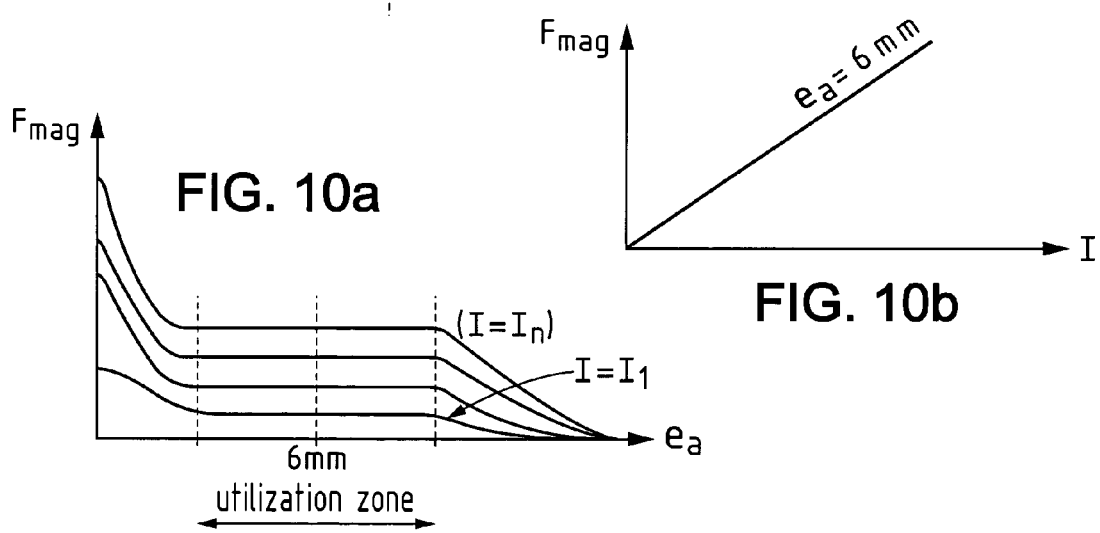
FIG. 10a
FIG. 10b
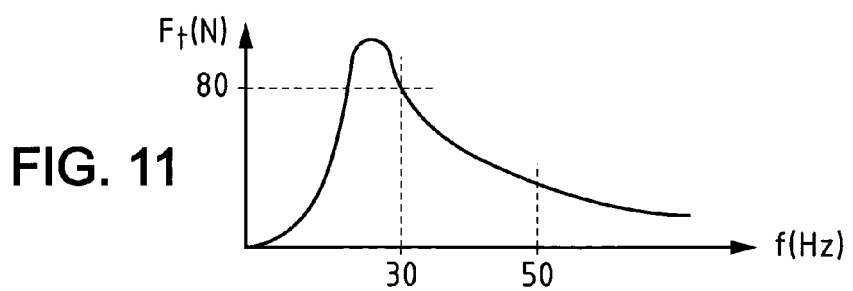
FIG. 11

ACTIVE DEVICE FOR DAMPING THE VIBRATIONS OF A VIBRATING ELEMENT

The present invention relates to the field of active devices for damping the vibrations of a vibrating element in a motor vehicle, which active devices are also known as active beaters.

More particularly, the invention relates to such devices comprising an actuator, which actuator itself comprises:

a coil extending circularly in a plane around a displacement axis and associated with a magnetically permeable yoke, and sliding with reciprocating motion along the displacement axis perpendicular to the plane of the coil, a varying electrical current being carried by the coil to generate a magnetic field; and a magnetically permeable armature linked to the vibrating element for which it is desired to damp vibration, by the action of reaction forces against the armature.

BACKGROUND OF THE INVENTION

An active device of that type is described in document EP 0 574 574 B1, for example.

Known devices of that type generally make use of a permanent magnet. Permanent magnets are fragile and sensitive to temperature. Their action is thus affected by variations in temperature, which variations are frequent in the vicinity of a motor vehicle engine. Furthermore, the cost of such magnets is high because of the rare materials that are used and because of the method used for making such magnets.

OBJECTS AND SUMMARY OF THE INVENTION

A particular object of the present invention is to mitigate those drawbacks.

To this end, the invention provides a device of the kind in question wherein the displacement of the coil relative to the armature is generated by forces corresponding to magnetic field lines generated by the coil, concentrated in the armature and in the yoke, and directed essentially through an airgap between the armature and the yoke.

By means of these dispositions, the magnetic flux in the airgap as generated by the electrical current flowing in the coil causes the coil and the yoke to move relative to the armature, without it being necessary to make use of permanent magnets. This type of active beater also makes it possible to achieve displacement travel of large amplitude, which is well adapted for use in damping the vibrations of a vehicle engine. In addition, the device of the invention is practically insensitive to temperature variations.

In embodiments of the device of the invention, the device comprises one or more of the following dispositions:

the airgap consists in a gap between the armature and the yoke, that is radial relative to the displacement axis the coil is centered on the displacement axis and the yoke includes an annular cavity in which the coil is housed, said annular cavity itself including a side wall extending inside the coil, substantially parallel to the displacement axis;

a portion of the side wall presents a shape that is substantially conical, being centered on the displacement axis, while the airgap corresponding to said portion is substantially constant; this conical shape enables a phenomenon of magnetic saturation to be created in the material, thereby making it possible to have a quasi-linear characteristic of magnetic force Fmag as a function of current and of displacement within the utilization zone;

the yoke comprises a bottom magnetic circuit and a top magnetic circuit, each substantially in the form of a groove, these grooves being substantially open towards each other so as to form the annular cavity of the yoke;

the bottom and top magnetic circuits are constituted by two like magnetic circuits disposed one on the other symmetrically about the plane of the coil, this makes providing the yoke very simple and the number of parts making it up is small;

each of the bottom and top magnetic circuits includes a respective rim extending radially outwards and adapted to be engaged by force with the other rim;

each of the bottom and top magnetic circuits includes a respective rim extending radially outwards and adapted to be engaged by force against a peripheral ring;

the bottom and top magnetic circuits are held together by a crimping ring;

the armature comprises a magnetically permeable central core which extends along the displacement axis at the center of the coil;

the yoke comprises a base extending over the central core in a plane perpendicular to the displacement axis, the central core and the base being separated by an axial airgap;

suspension means are adapted to urge the yoke and the coil to react against the force exerted by the magnetic field along the displacement axis;

the suspension means are metal springs or rubber springs;

guide rings are fixed to the yoke or to the armature, they are adapted to guide the displacement of the coil, they slide along the central core;

the coil is engaged at least in part in a plastics material used for winding the wire coil and optionally including portions in relief adapted to exert prestress on the coil when the coil is housed in the yoke so as to limit movements of the coil in the yoke;

a guide bearing extends the armature along the displacement axis, being adapted to co-operate with the yoke and to guide the displacement along the displacement axis of the moving assembly constituted by the coil and the yoke; and the guide bearing is of a diameter smaller than that of the armature.

BRIEF DESCRIPTION OF THE DRAWINGS

Other characteristics and advantages of the invention will appear further on reading the following description. The description is purely illustrative and should be read with reference to the accompanying drawings, in which:

FIG. 8 is a diagrammatic radial section of an eighth embodiment of the device of the invention;

FIG. 9 is a simplified linear model of an active beater;

FIG. 10a shows the magnetic force Fmag as a function of the axial airgap $e_a$ for current of different values;

FIG. 10b shows the magnetic force Fmag as a function of current I; and

FIG. 11 shows the response to the force Ft as a function of frequency f.

MORE DETAILED DESCRIPTION

Eight embodiments of the device of the invention are described below.

Figure 1:
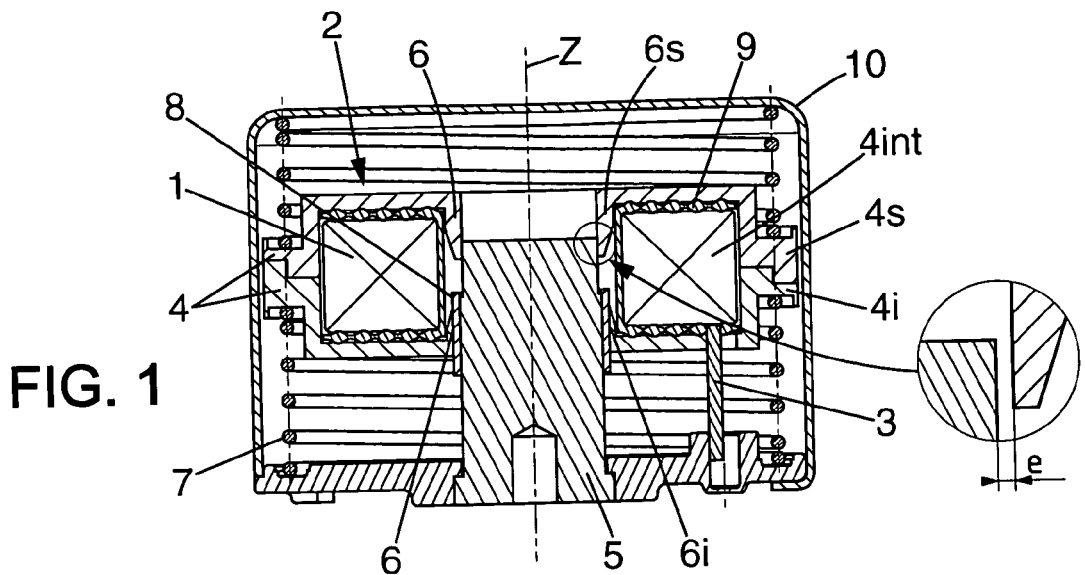
FIG. 1 is a diagrammatic radial section of a first embodiment of the device of the invention.

In the first embodiment shown in FIG. 1, the device comprises an actuator 2. The actuator 2 comprises a coil 1 which extends circularly around a displacement axis Z. The coil 1 is electrically connected via connection means 3 to power supply and control means (not shown) serving to deliver electrical current and to control the device of the invention.

The actuator 2 comprises a magnetically permeable yoke 4 secured to the coil 1. The yoke 4 forms an annular cavity 4int extending circularly around the displacement axis Z. The coil 1 is received in this annular cavity 4int.

The yoke 4 has a side wall 6 extending substantially parallel to the displacement axis Z inside the coil 1. This side wall 6 faces a magnetically permeable armature 5. At least at some points along the displacement axis Z, the wall 6 is spaced apart from the armature by a radial airgap e.

In this described embodiment, the armature 5 is substantially cylindrical in shape. In the embodiment of FIG. 1, it is constituted by a central core extending along the displacement axis and centered relative to said displacement axis Z. The central armature 5 is for connecting directly or indirectly to the vibrating element for which it is desired to reduce its vibrations.

Under the effect of the magnetic field generated by a varying electrical current supplied via the connection means 3 and carried by the coil 1, the coil and the surrounding yoke 4 slide with reciprocating motion along the displacement axis Z.

The magnetic field lines are concentrated in the armature 5 and the yoke 4, and they are also concentrated in the airgap e. This airgap e does not vary during displacement of the coil. The displacement of the yoke 4 and of the coil 1 is generated essentially by forces due to variations in the reluctance of the magnetic circuit.

By means of reaction forces on the armature 5 linked to the displacement of the coil 1 associated with the yoke 4, forces are generated in the armature 5. These forces produce counter-vibrations. These counter-vibrations generated by the device of the invention are adapted to damp the vibrations of the vibrating element.

In the embodiment shown in FIG. 1, the side wall 6 comprises two portions, respectively a top portion 6s and a bottom portion 6i. Each top or bottom portion 6s or 6i presents a transverse width that decreases going towards the other portion 6i or 6s of the side wall 6. These portions 6s and 6i belong respectively to two magnetic circuits 4s and 4i, each substantially in the form of a groove and including a rim that extends radially outwards, the magnetic circuits being symmetrical (one of the two portions optionally being machined to enable them to be distinguished) and they engage mutually by complementary shapes, thus constituting the annular cavity 4int inside the yoke 4. By way of example, they may be engaged one in the other by force.

The device of the invention further comprises guide rings 8 which in this case are fixed to the bottom side wall 6i of the yoke 4.

The top portion 6s of the wall 6 is spaced apart from the armature 5 by the airgap e.

The spacing between the armature 5 and the bottom portion 6i is occupied in this case by the guide rings.

The device of the invention as shown in FIG. 1 includes suspension means 7 comprising metal or rubber springs placed on the coil 1 (or on the associated yoke 4) to urge it to react against the force Fmag that acts between the yoke 4 and the armature 5. This type of suspension provides good strength against the applied stresses and allows for the large-amplitude movements that are required for beating at low frequency (f in the range 15 hertz (Hz) to 50 Hz), for example. It is thus advantageous to use such springs instead of suspensions based on metal or composite spring blades.

FIG. 9 shows a simplified linear model of an active beater using a magnetic force Fmag so transmit a force Ft to the vibrating element at a frequency f, with displacement z, using a suspension (where k represents the stiffness constant of the beater, and where c represents the damping coefficient of the beater) that enables resonance to amplify the displacement of the suspended mass m. The equations governing this beater are as follows:

$$Ft = kz + c\dot{z} - F\text{mag}$$

$$m\ddot{z} = -kz - c\dot{z} + F\text{mag}$$

FIG. 11 shows the response of the force Ft as a function of frequency f. This force also depends on the electrical current. By suitable choices for the parameters (by way of illustration, m=1.1 kilograms (kg), c=40 Newton-seconds per meter (Ns/m), k=22,000 Newtons per meter (N/m), and Fmag=40 Newtons (N)), it has been found that this beater can transmit a large force (greater than 80 N) to the vibrating element for frequencies that are substantially below 30 Hz.

The assembly is covered by an outer crimping element 10 which applies prestress to the springs so that they work continuously in compression.

It should be observed that the mean position of the central armature 5 is not centered on the axis Z relative to the two portions 6s and 6i of the yoke 4, thus enabling the force to be produced.

In other embodiments, the armature can be disposed so as to surround the coil and the yoke.

The materials used are preferably standard and inexpensive. Thus, the magnetically permeable material used may be lightly-alloyed magnetic steel, for example mild steel having a low carbon content (XC48, XC42) so that there is no remanence, or else an iron-silicon or an iron-nickel alloy. The parts 6s and 6i of the yoke are substantially circularly cylindrical in shape, and consequently easy to make. They could be obtained merely by casting a magnetic steel, or by applying a high level of compression to a hot mixture of resin and iron powder having magnetic characteristics, or by high speed machining, etc.

The coil may be made of copper.

The device of the invention is controlled via the connection means 3, and the control can be performed either in an open loop relying solely on information relating to engine round signal, or else it may be adapted from time to time on the basis of information concerning vibration and/or noise and coming from an electronic tool, e.g. as delivered by the automobile manufacturer.

Advantageously, the outside faces of the coil that are to come into contact with the yoke 4 are covered in a plastics material carrying studs 9 that are flattened when the coil is secured to the yoke 4, e.g. by crimping. This prestress on the coil 1 serves, when current is applied, to ensure that it is the assembly comprising the coil 1 and the yoke 4 that vibrates.

References in FIGS. 2 to 8 below carrying the same numbers as references in FIG. 1 designate elements that are similar. For each of FIGS. 2 to 8, the description below relates only to the main characteristics distinguishing them from the figures described above.

Figure 2:
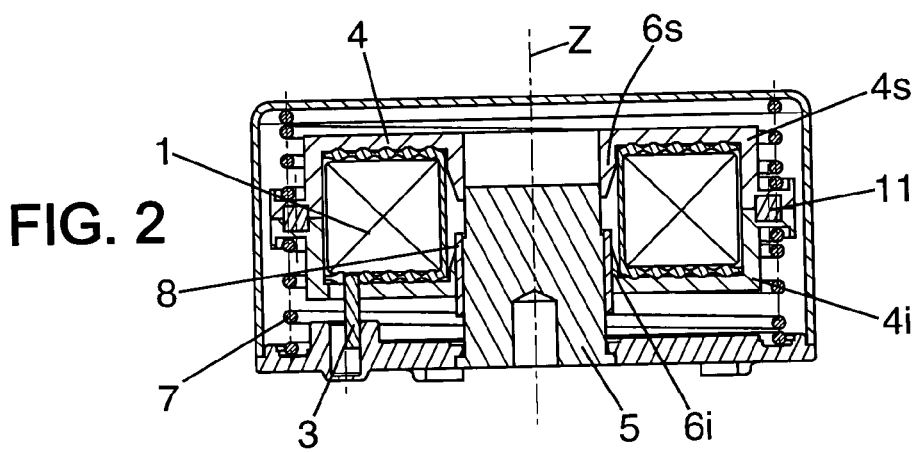
FIG. 2 is a diagrammatic radial section of a second embodiment of the device of the invention.

In the second embodiment, shown in FIG. 2, the top and bottom portions 6s and 6i respectively of the yoke 4 are fixed together by means of pegs or rings 11.

Figure 3:
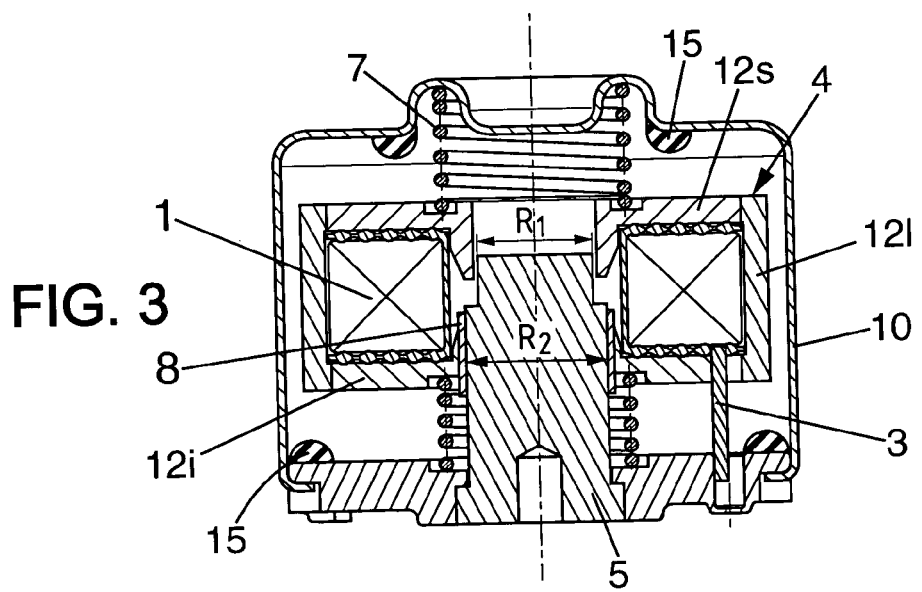
FIG. 3 is a diagrammatic radial section of a third embodiment of the device of the invention.

In the third embodiment, shown in FIG. 3, the yoke 4 is no longer made up of symmetrical portions of the type shown in FIGS. 1 and 2, but comprises three different portions that are assembled together, respectively constituting a bottom portion 12i, a top portion 12s, and a lateral portion 12l.

The armature 5 is made up of two substantially cylindrical portions of diameters R1 and R2 such that the top portion 12s of the yoke 4 slides along the portion of the armature 5 that is of diameter R1, while the bottom portion 12i of the yoke 4 slides along the portion of the armature 5 that is of diameter R2.

The outer crimping element 10 further comprises rubber abutments 15 disposed towards the assembly constituted by the coil 1 and the armature 5 so as to damp end-of-stroke travel prior to making contact with the crimping element 10, prior to making contact between the turns of the metal springs, when metal springs are used for making the suspension.

Figure 4:
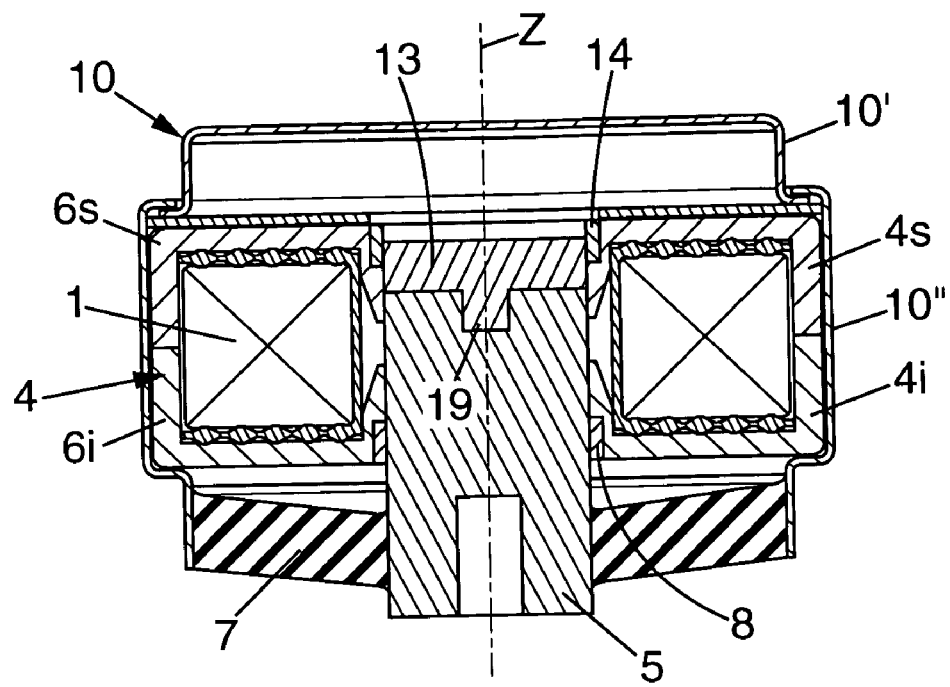
FIG. 4 is a diagrammatic radial section of a fourth embodiment of the device of the invention.

In the fourth embodiment shown in FIG. 4, the armature 5 is surmounted by a guide piece 13 having the same diameter as the armature 5 and made of a non-magnetic material. The top and bottom portions 6s and 6i of the yoke 4 are fitted with guide rings 14 adapted to guide displacement along the displacement axis Z of the coil 1 and of the yoke 4, on the armature 5 as extended by the guide piece 13.

The armature 5 and the piece 13 may be assembled together by mutual engagement, the armature 5 presenting a bore 19 centered on the axis Z in which a portion of the piece 13 is engaged as a tight fit.

The outer crimping element 10 is of a shape that is adapted to hold tightly together the assembly constituted by the coil 1 and the yoke 4, thus keeping the bottom and top portions 4i and 4s of the yoke assembled together. The crimping element 10 is constituted by a top portion 10' and a bottom portion 10". The bottom portion 10" describes two bends within which it encompasses the coil 1. The top portion 10' acts as a cover for the crimping element 10 and also describes a bend which is itself held between a bend of the bottom portion 10" and the coil. In this embodiment (and in the following embodiments described below), it is thus the assembly constituted by the crimping element 10, the coil 1, and the yoke 4 which moves along the displacement axis Z.

In this embodiment and those described below, the suspension means 7 are constituted by rubber bonded to the armature 5 and the inside wall of the crimping element 10. The suspension means enable the assembly comprising the coil 1 and the yoke 4 to move relative to the armature 5 while simultaneously damping this movement and elastically returning the coil 1 to its equilibrium position relative to the armature 5.

Figure 5:
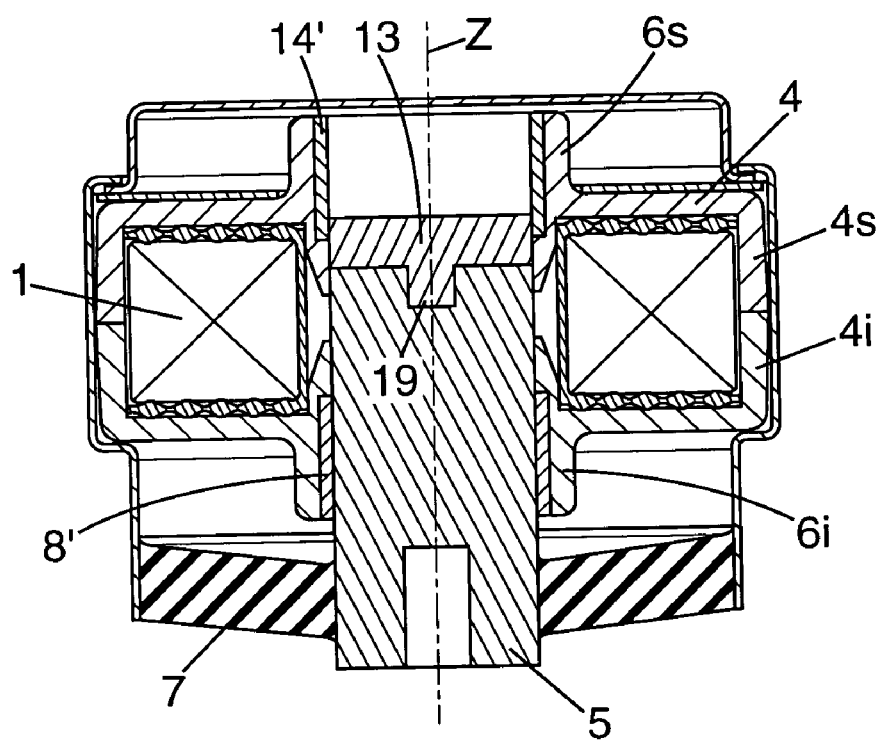
FIG. 5 is a diagrammatic radial section of a fifth embodiment of the device of the invention.

In the fifth embodiment shown in FIG. 5, the top and bottom portions 4s and 4i of the yoke 4 are provided with shoulders 8' and 14' extending along the displacement axis Z to provide better guidance for the assembly constituted by the coil 1 and the yoke 4 along the armature 5.

Figure 6:
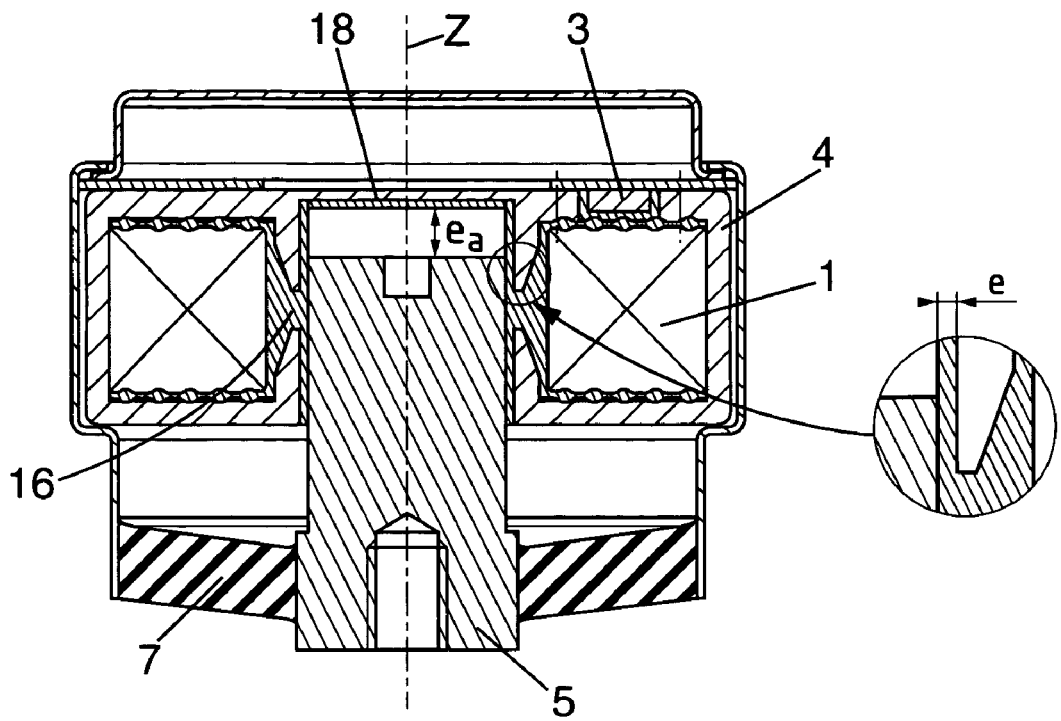
FIG. 6 is a diagrammatic radial section of a sixth embodiment of the device of the invention.

In the sixth embodiment shown in FIG. 6, there can be seen a guide bearing 16 which can be used alone or optionally to be complementary to the guide bearings described in the preceding embodiments.

This guide bearing 16 is constituted by a piece of plastics material forming a part of the plastics portion of the coil 1 around which the winding is made. It comes practically into contact with the armature 5 between the bottom and top portions 6i and 6s, and it extends along the armature 5 along the axis Z. This piece of plastics material thus serves as a guide bearing; the plastics portion of which it forms a part serves as a support for the coil, and by way of example the assembly may constitute a mold for molding the yoke 4 out of metal powder.

In addition, the yoke 4 includes a base 18 made of a magnetically permeable material extending over the armature 5 in a plane perpendicular to the displacement axis Z. The device of the invention as shown in FIG. 6 thus presents an axial airgap $e_a$ which varies as a function of the displacement of the coil 1, and an airgap e as described above, but in this case constituted by the thickness of the plastics wall of the part 16.

FIG. 10a plots a set of curves representing the magnetic force Fmag as a function of the axial airgap $e_a$ for various increasing values of current $I_1, \ldots, I_n$.

In a "utilization" zone corresponding to a range of values taken by the axial airgap $e_a$, the values of Fmag as a function of current I for an unchanging airgap $e_a$ are substantially linear, as shown for example in FIG. 10b which relates to the value of $e_a$ being fixed at 6 millimeters (mm).

Figure 7:
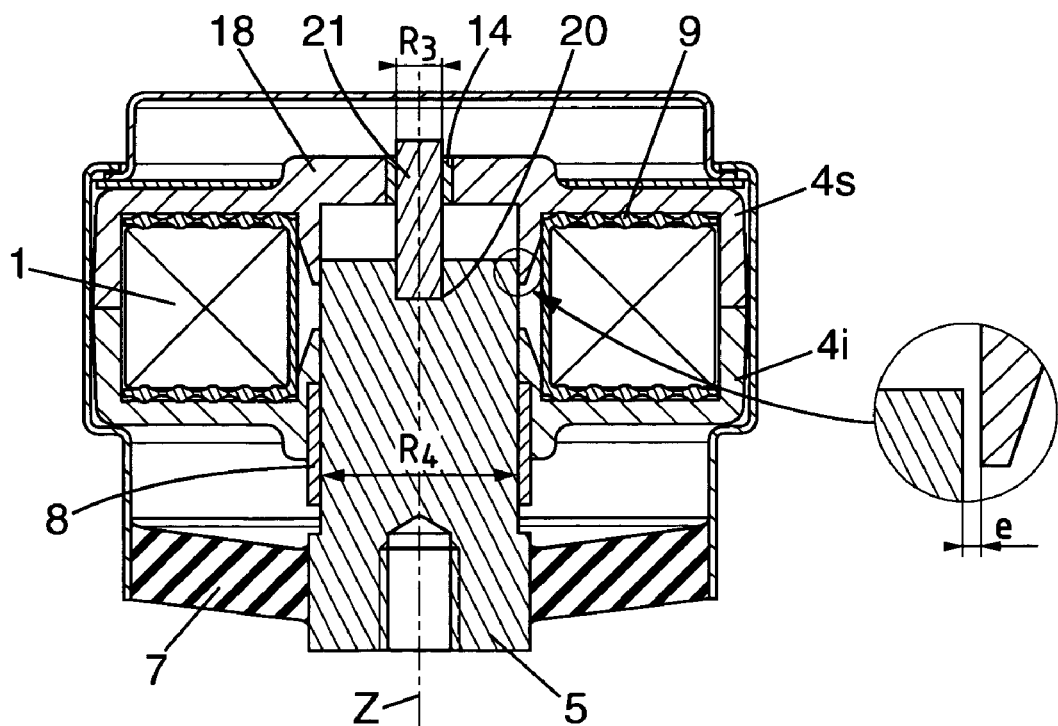
FIG. 7 is a diagrammatic radial section of a seventh embodiment of the device of the invention.

In the seventh embodiment, shown in FIG. 7, the yoke 4 is fitted with two guide rings 8 and 14 of respective diameters R3 and R4 where R4 is greater than R3. The guide ring 14 of diameter R3 is fitted to the inside wall of a passage made through the base 18.

The armature 5 presents a cavity 20 in its top portion centered relative to the displacement axis Z. A central rod or guide bearing 21 made of magnetic or non-magnetic material and of substantially cylindrical shape is engaged in the cavity 20. This guide bearing 21 presents a diameter that is suitable for providing guidance by co-operating with the guide ring 14, so as to guide the coil 1 while it moves along the axis Z.

In another embodiment, the guide bearing 21 and the armature 5 can be made as a single piece, in which case the material used is the same for both elements.

In the eighth embodiment, shown in FIG. 8, the armature 5 is hollow over substantially its entire length along the axis Z and thus presents a housing, e.g. a substantially cylindrical housing 5'. The base 18 is provided with a cylindrical element 22, opposite the housing 5' in the armature and of dimensions adapted to slide in the housing 5' along a cylindrical guide bearing 23 situated between the armature 5 and the cylindrical element 22. Depending on the embodiment, this guide bearing can be secured to the armature 5 or to the cylindrical element 22.

The active vibration-damper device of the invention presents good efficiency. The force developed by such a device is a function of the moving mass and of its travel. In actuator technology, providing guidance by means of bearings and the suspension enables travel of large amplitude to be provided. Because the moving mass of the device of the invention comprises the coil 1 and the yoke 4, the moving mass can represent more than 80% of the total mass. These two above-mentioned useful parameters are therefore optimized in a device of the invention.

What is claimed is:

1. An active device for damping vibrations of a vibrating element for a motor vehicle, the device comprising an actuator itself comprising: a coil extending about a displacement axis, and associated with a magnetically permeable yoke, and sliding with reciprocating motion along the displacement axis of the coil, a varying electrical current being carried by the coil to generate a magnetic field; and a magnetically permeable armature linked to the vibrating element for which it is desired to damp vibration, by the action of reaction forces against the armature; wherein the displacement of the coil relative to the armature is generated by forces corresponding to magnetic field lines generated by the coil, concentrated in the armature and in the yoke, and directed essentially through an airgap between the armature and the yoke.

2. A device according to claim 1, in which the airgap consists in a gap between the armature and the yoke, that is radial relative to the displacement axis.

3. A device according to claim 1, in which the coil is centered on the displacement axis and the yoke includes an annular cavity in which the coil is housed, said annular cavity itself including a side wall extending inside the coil, substantially parallel to the displacement axis.

4. A device according to claim 3, in which a portion of the side wall presents a shape that is substantially conical, being centered on the displacement axis, while the airgap corresponding to said portion is substantially constant.

5. A device according to claim 3, in which the yoke comprises a bottom magnetic circuit and a top magnetic circuit, each substantially in the form of a groove, these grooves being substantially open towards each other so as to form the annular cavity of the yoke.

6. A device according to claim 5, in which the bottom and top magnetic circuits are constituted by two like magnetic circuits disposed one on the other symmetrically about the plane of the coil.

7. A device according to claim 5, in which each of the bottom and top magnetic circuits includes a respective rim extending radially outwards and adapted to be engaged by force with the other rim.

8. A device according to claim 6, in which each of the bottom and top magnetic circuits includes a respective rim extending radially outwards and adapted to be engaged by force against a peripheral ring.

9. A device according to claim 5, in which the bottom and top magnetic circuits are held together by a crimping ring.

10. A device according to claim 1, in which the armature comprises a magnetically permeable central core which extends along the displacement axis at the center of the coil.

11. A device according to claim 10, in which the yoke comprises a base extending over the central core in a plane perpendicular to the displacement axis, the central core and the base being separated by an axial airgap.

12. A device according to claim 1, including suspension means adapted to urge the yoke and the coil to react against the force exerted by the magnetic field along the displacement axis.

13. A device according to claim 12, in which the suspension means are metal springs or rubber springs.

14. A device according to claim 10, including guide rings secured to the yoke or to the armature, adapted to guide displacement of the coil, and sliding along the central core.

15. A device according to claim 1, in which the coil is engaged at least in part in a plastics material including portions in relief adapted to exert prestress on the coil when the coil is housed in the yoke so as to limit movements of the coil in the yoke.

16. A device according to claim 1, in which a guide bearing extends the armature along the displacement axis, being adapted to co-operate with the yoke and to guide the displacement along the displacement axis of the moving assembly constituted by the coil and the yoke.

17. A device according to claim 16, in which the guide bearing is of a diameter smaller than that of the armature.

\* \* \* \* \*